(12) United States Patent
Shemtov

(10) Patent No.: US 8,129,633 B1
(45) Date of Patent: Mar. 6, 2012

(54) CONNECTOR ASSEMBLY SUITED FOR WET LOCATIONS

(76) Inventor: Sami Shemtov, Hollywood, FL (US)

( * ) Notice: Subject to any disclaimer, the term of this patent is extended or adjusted under 35 U.S.C. 154(b) by 233 days.

(21) Appl. No.: 12/725,502

(22) Filed: Mar. 17, 2010

(51) Int. Cl.
 *H02G 3/18* (2006.01)

(52) U.S. Cl. ........ 174/652; 174/655; 174/656; 439/583; 285/382.7; 248/56

(58) Field of Classification Search .................. 174/652, 174/653, 655, 656; 439/578, 583, 584; 285/382.7; 248/56
See application file for complete search history.

(56) References Cited

U.S. PATENT DOCUMENTS

| | | | | |
|---|---|---|---|---|
| 4,030,741 A | * | 6/1977 | Fidrych | 285/149.1 |
| 4,088,348 A | | 5/1978 | Shemtov | |
| 4,159,134 A | | 6/1979 | Shemtov | |
| 4,159,859 A | | 7/1979 | Shemtov | |
| 4,549,755 A | * | 10/1985 | Kot et al. | 285/341 |
| 4,606,562 A | * | 8/1986 | Saraceno | 285/149.1 |
| D287,396 S | | 12/1986 | Shemtov | |
| 4,641,863 A | | 2/1987 | Shemtov | |
| 5,037,140 A | * | 8/1991 | Anderson | 285/139.2 |
| D376,415 S | | 12/1996 | Shemtov | |
| 6,476,319 B1 | | 11/2002 | Shemtov | |
| 6,808,181 B1 | | 10/2004 | Shemtov | |
| 6,835,088 B2 | | 12/2004 | Shemtov | |
| 6,939,160 B2 | | 9/2005 | Shemtov | |
| 6,988,746 B2 | * | 1/2006 | Olson | 285/151.1 |
| 7,126,064 B1 | | 10/2006 | Shemtov | |
| 7,390,027 B2 | * | 6/2008 | Kiely | 285/151.1 |
| 7,476,817 B1 | | 1/2009 | Shemtov | |
| 7,635,816 B1 | | 12/2009 | Shemtov | |
| 7,976,070 B2 | * | 7/2011 | Kiely | 285/151.1 |
| 2005/0194785 A1 | | 9/2005 | Shemtov | |

* cited by examiner

*Primary Examiner* — Dhirubhai R Patel
(74) *Attorney, Agent, or Firm* — Craig A. Fieschko, Esq.; DeWitt Ross & Stevens S.C.

(57) ABSTRACT

An exemplary connector assembly includes a connector body, a compression nut, a compression ring, and a sealing ring. A conduit may be inserted through the compression nut and the connector body. The compression ring may include a circumferential gap between two complementarily interfittable circumferential ends to allow it to compress, and the sealing ring may vary in diameter along its axial length. As the connector body screws into the compression nut, the compression nut presses against the compression ring, which in turn pushes the sealing ring against the connector body. The connector body may include a connector chamfer. The sealing ring pressing against the connector body, preferably against the connector chamfer, forms a seal between the conduit and the connector body. The seal resists contaminants such as dust and moisture. Compression of the compression ring around the conduit helps secure the conduit to the compression nut and the connector body.

20 Claims, 4 Drawing Sheets

CONNECTOR ASSEMBLY SUITED FOR WET LOCATIONS

FIELD OF THE INVENTION

This document concerns an invention relating generally to connector assemblies suited for wet locations.

BACKGROUND OF THE INVENTION

Electrical and mechanical components such as cables often need to be connected with each other through various angles and configurations. Conduits (such as pipes) and junction boxes may be used to house electrical cables, and connectors are used to join conduits with each other and/or with other components such as junction boxes in desired configurations. For example, U.S. Pat. No. 7,635,816 to Shemtov discloses a connector/bushing assembly for electrical junction boxes. Connector assemblies make use of such connector elements as connector bodies, nuts, gaskets, and bushings to provide the configurations desired for the conduits that house electrical and mechanical components.

The components brought together by connector assemblies can be sensitive to contaminants such as dust and moisture. If a proper seal is not formed between and among the elements of the connector assembly, the electrical and mechanical components are susceptible to contamination and thus not adequately protected. What is needed is a versatile connector assembly that provides superior resistance to contaminants like dust and moisture.

SUMMARY OF THE INVENTION

The invention, which is defined by the claims set forth at the end of this document, is directed to connector assemblies which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIG. 1, an exemplary connector assembly 100 includes a connector body 150, a compression ring 130, a compression nut 120, and a sealing ring 140, each of which is preferably cylindrical. As shown in FIG. 2, the connector body 150 may be inserted in the compression nut 120, with the compression nut 120 pressing against the compression ring 130, the compression ring 130 pressing against the sealing ring 140, and the sealing ring 140 pressing against the connector body 150. An optional conduit 110 may be inserted through the compression nut 120. The compression ring 130 helps secure the conduit 110 to the connector assembly 100. The pressing of the sealing ring 140 against the connector body 150 helps form a superior seal between the connector body 150 and the conduit 110. This seal resists contaminants such as dust and moisture. The interaction of the various components is further discussed below.

Returning to FIG. 1, the compression nut 120 further includes a nut first axial end 200 and a nut second axial end 190. The nut first axial end 200 preferably has a nut first end inner surface 370 that is threaded. The nut second axial end 190 may have a nut second end outer surface 360 that is irregular to enhance gripping.

As shown in FIG. 3, the connector body 150 includes a connector first axial end 250, a connector second axial end 230, and a connector middle axial portion 240 positioned between the connector first axial end 250 and the connector second axial end 230. The connector first axial end 250 preferably includes a connector first end outer surface 350 that is threaded, and the connector second axial end 230 preferably includes a connector second end outer surface 320 that is threaded. The connector middle axial portion 240 may include a connector middle outer surface 380 that is irregular for easier gripping.

As shown in FIG. 4, the compression ring 130 includes a first circumferential end 280 and a second circumferential end 290 that is complementarily interfittable with the first circumferential end 280. The compression ring 130 also includes a circumferential gap 300 between the first circumferential end 280 and the second circumferential end 290. The circumferential gap 300 of the compression ring 130 allows the compression ring 130 to compress, such compression bringing the first circumferential end 280 and second circumferential end 290 closer together and narrowing the circumferential gap 300. Referring also to FIG. 2, once the sealing ring 140 is pressed against the connector body 150, the screwing of the compression nut 120 with the connector body 150 compresses the compression ring 130. Once the compression ring 130 is tightly wrapped around the conduit 110, the compression nut 120 no longer screws with the connector body 150. The circumferential gap 300 narrows but need not close for the conduit 110 to be secured to the connector assembly 100. The compression ring 130 may optionally include a bevel 260, enhancing compression of the compression ring 130 and the interaction of the compression ring 130 with the sealing ring 140.

As depicted in FIG. 2, the connector body 150 preferably interfaces with the compression nut 120 by having its connector second axial end 230 screw into the nut first axial end 200 through the interaction of the threaded surfaces 320 (see FIG. 3) and 370 (see FIG. 1). The compression ring 130 and sealing ring 140 may be positioned within the compression nut 120, preferably within the nut second axial end 190. The inner surfaces 340 and 310 of the connector first axial end 250 and the connector second axial end 230, respectively, may be substantially smooth, making it easier for a conduit 110, electrical cable (not pictured), or other component to be inserted therein.

Returning to FIG. 1, the sealing ring 140 includes a sealing ring first axial end 220 and a sealing ring second axial end 210 opposing the sealing ring first axial end 220. The diameter of the sealing ring first axial end 220 is preferably less than the diameter of the sealing ring second axial end 210. The connector second axial end 230 optionally includes a connector chamfer 270 (see FIG. 3), making the connector body 150 more interfittable with the sealing ring 140. The connector chamfer 270 presses against the sealing ring first axial end 220 (with the smaller diameter) as a result of the connector body 150 screwing into the compression nut 120. Such interaction of the sealing ring 140 with the connector chamfer 270 enhances the water- and contaminant-resistance of the connector assembly 100. The sealing ring second axial end 210 may additionally include a sealing ring chamfer 330 (see FIG. 2) that is more interfittable with a compression ring first axial end 400 (see FIG. 4).

As depicted in FIG. 2, the connector first end outer surface 350 (see FIG. 3) of the connector first axial end 250 may interface with nuts, junction boxes, or other assembly components via an optional gasket 160, locknut 170, and bushing 180. The connector first axial end 250 (with gasket 160 thereon and bushing 180 therein) may be inserted through a first side of an opening in a junction box, and the locknut 170 may be screwed onto the connector first axial end 250 from a second side of the opening in the junction box, securing the connector body 150 to the junction box (not pictured). As an electrical cable, for example, is inserted through the opening of the junction box and through the connector first axial end 250, the bushing 180 protects the electrical cable from chaffing against the connector first axial end 250. The gasket 160, the locknut 170, and the bushing 180 resist contaminants between the connector body 150 and the junction box.

The connector body 150, the compression ring 130, and the compression nut 120 may be made of metal or plastic, constructed using, for example, steel. The sealing ring 140 is preferably non-metal, made of, for example, nylon or other insulating material. The gasket 160 may be made of an elastomer such as rubber, the locknut 170 may be made of a metal or plastic, and the bushing 180 may be made from an insulating material such as nylon.

The exemplary connector assembly 100 described herein, along with variations thereof, is a versatile assembly that provides superior protection against contaminants and moisture. Further advantages and features of the invention will be apparent from the remainder of this document in conjunction with the associated drawings.

DETAILED DESCRIPTION OF PREFERRED VERSIONS OF THE INVENTION

Figure 1:
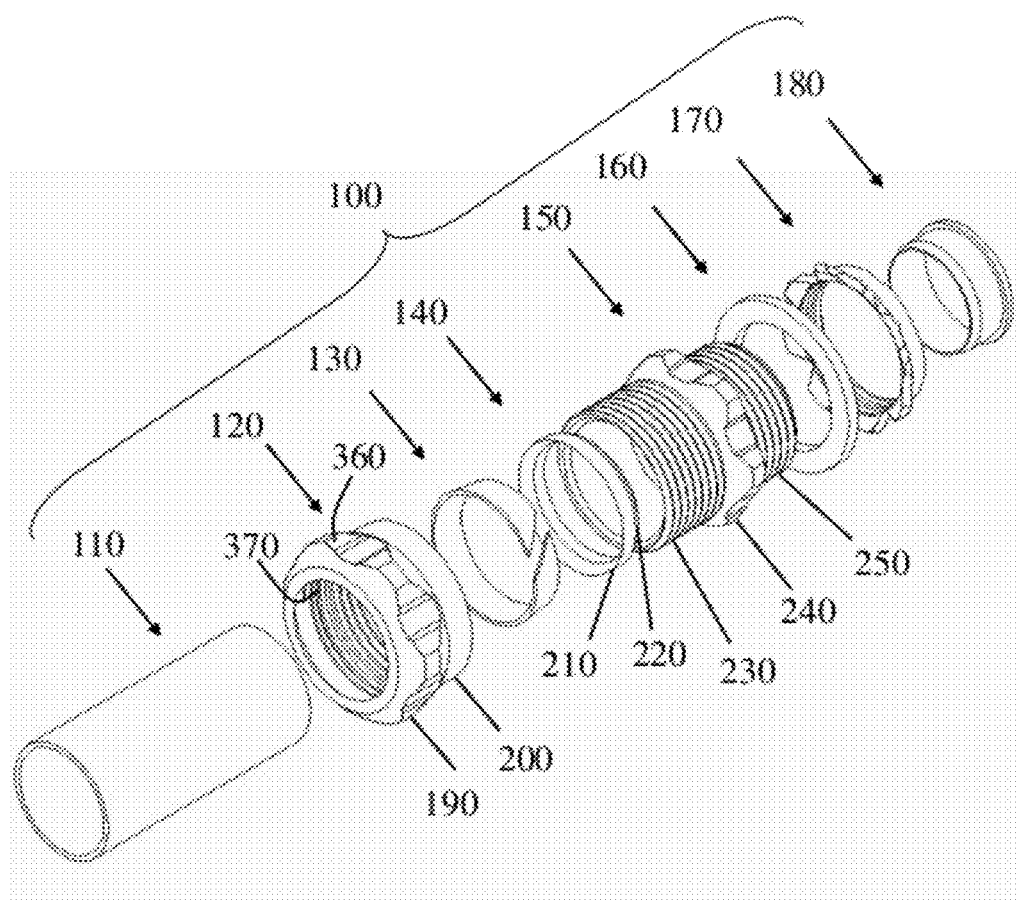
FIG. 1 is an exploded perspective view of an exemplary connector assembly 100.

Continuing the discussion in the Summary section, the configuration of the connector assembly 100 shown in FIG. 1 is merely exemplary, and the numbers and types of components used in an assembly can be changed as desired. For example, connector bodies 150 and compression nuts 120 can be added or taken away, and the selected components can be interfaced together as needed, optionally using additional compression rings 130 and sealing rings 140 to secure conduits 110 and to enhance the seal formed between the selected components. Another compression nut 120, compression ring 130, and sealing ring 140 can be interfaced with the connector first axial end 250, for example, so that connector body 150 bridges two conduits 110.

The inner and outer surfaces of the components can be substantially smooth, irregular, or threaded so that they can be slid past each other, gripped, or screwed together as needed. Additionally, the diameters of their various ends can be adjusted to permit the components to interface with each other and other components as desired. Further, the axial lengths of the various components can be adjusted so that they can better accommodate each other or additional components of varying dimensions. Furthermore, the diameter of any of the components used in the connector assembly 100 need not remain constant along the axial length of the component. For example, the diameter of the connector body 150 may be variable along its axial length, increasing or decreasing gradually or in a stepwise fashion from the first connector end 250 to the second connector end 230. Additionally, the diameter of the sealing ring 140 may vary in a stepwise fashion from the first sealing ring end 220 to the second sealing ring end 210, rather than varying gradually along its axial length.

Figure 3:
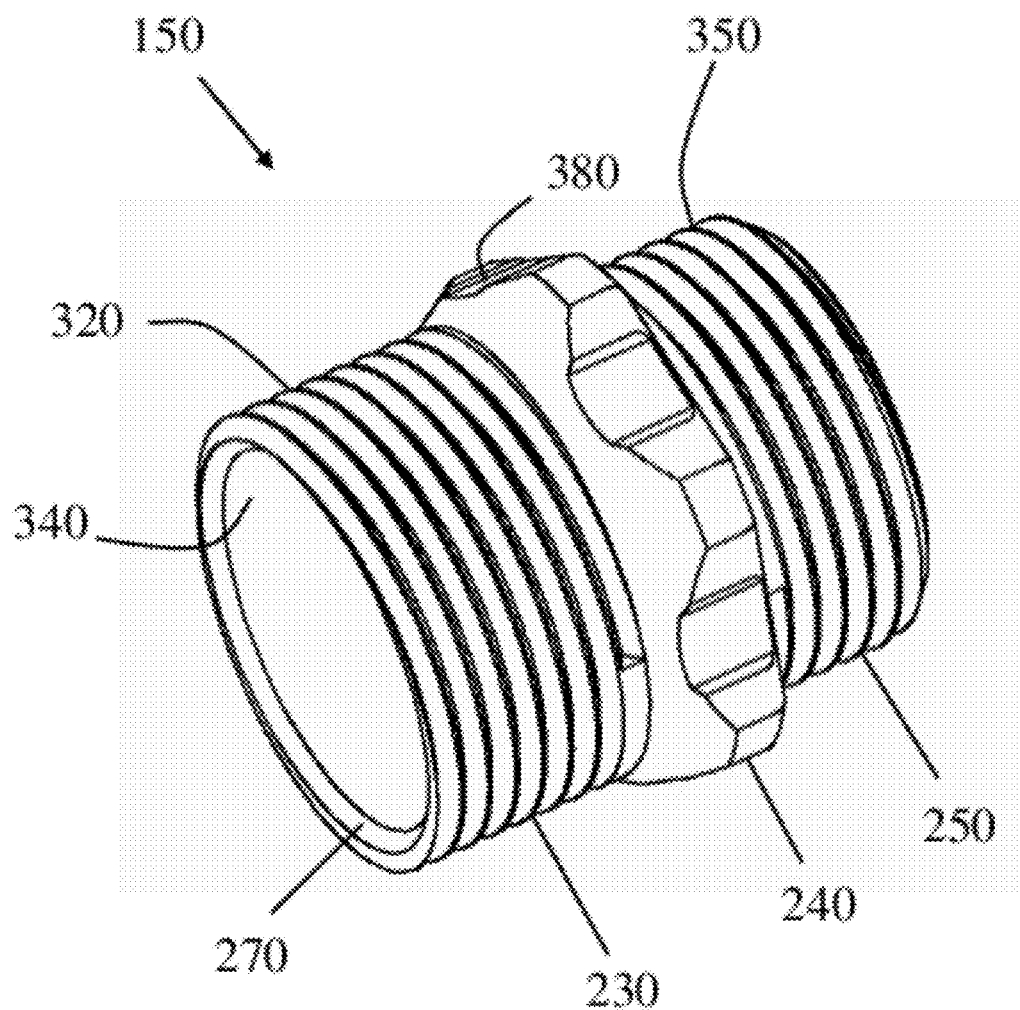
FIG. 3 is a perspective view of the compression ring 130 in the connector assembly 100 of FIG. 1.

The connector assembly 100 can be further modified in many ways, enhancing its versatility. As depicted in FIG. 3, the connector body 150 has connector first axial end 250 and connector second axial end 230 with substantially the same diameter. However, the diameter of the connector first axial end 250 may be different from the diameter of the connector second axial end 230. For example, the connector first axial end 250 may be given one diameter so that it may interface with a given junction box, and the connector second axial end 230 may be given another diameter so that it interface with a particular compression nut 120 that can house a conduit 110 with another diameter.

Figure 2:
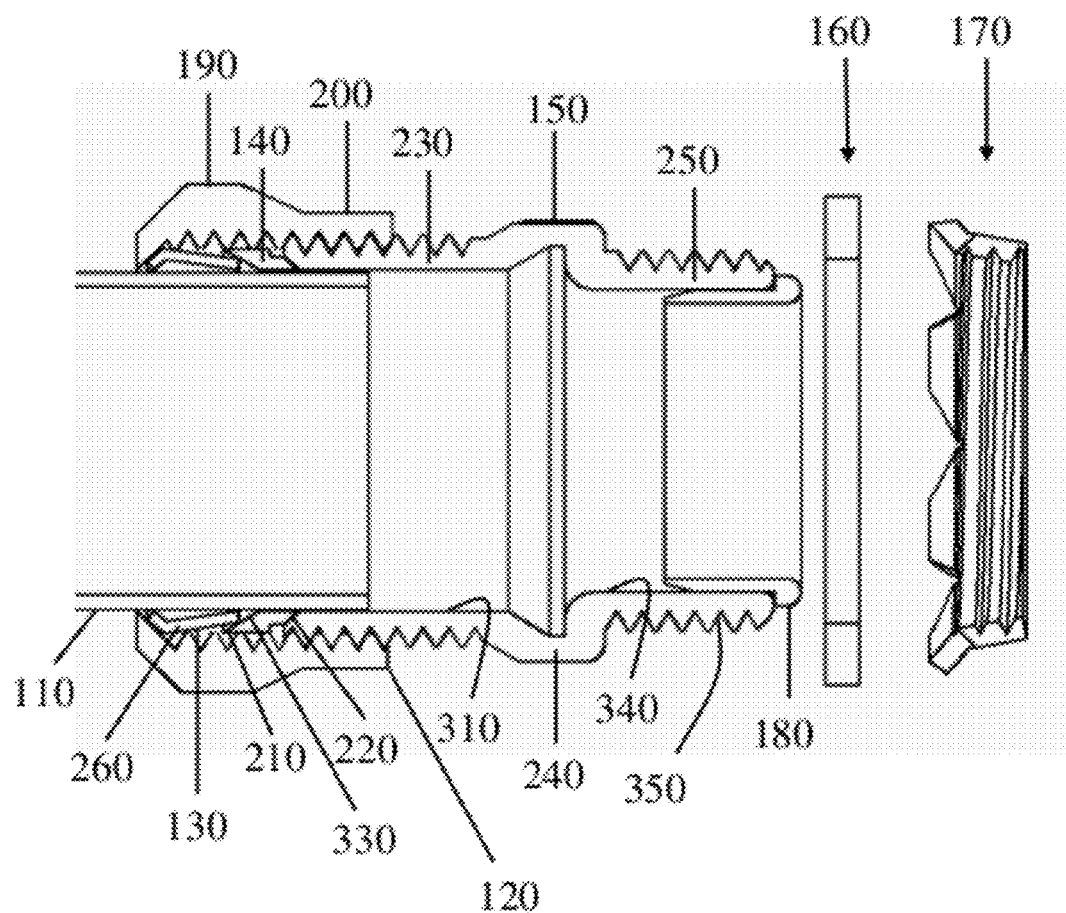
FIG. 2 is a cross-section view of the connector assembly 100 of FIG. 1.
Figure 4:
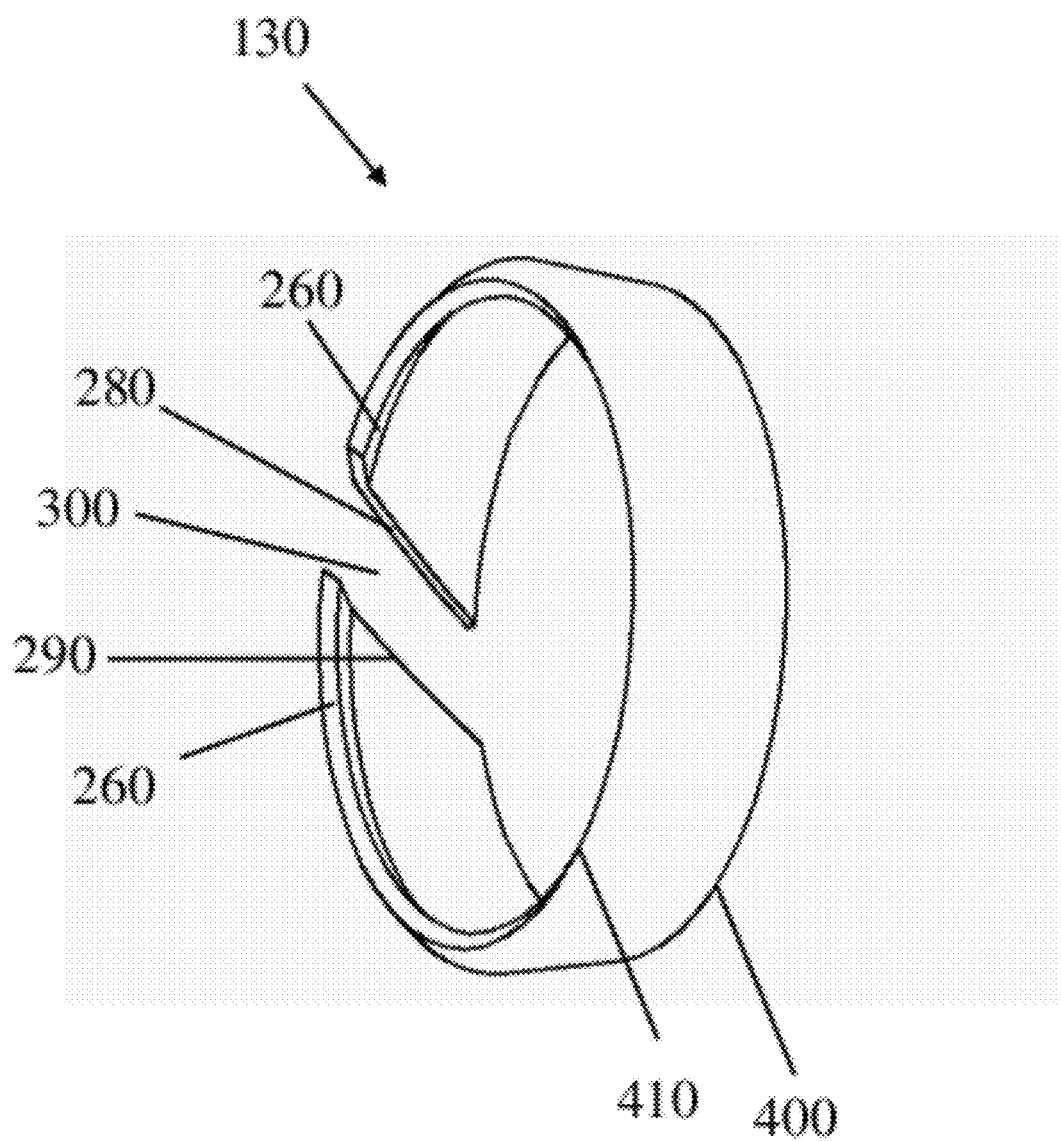
FIG. 4 is a perspective view of the connector body 150 in the connector assembly 100 of FIG. 1.

Referring to FIG. 4, the compression ring 130 may be shaped in a variety of different ways. For example, compression ring 130 may alternatively or additionally include an outward radial bulge that is axially positioned between the first axial compression ring end 400 and a second axial compression ring end 410. Such a radial bulge may press against the inner surface of the component in which it is inserted, such as against the nut first end inner surface 370 (see FIG. 1) as the connector second axial end 230 screws into the nut first axial end 200 (see FIG. 2). Additionally, the compression ring 130 need not include the bevel 260. Moreover, the complementarily interfittable circumferential ends 280 and 290 can alternatively be shaped as complementary geometric shapes, curves, teeth, or any male/female combination of shapes that can fit together.

The circumferential gap 300 can vary greatly in size. The circumferential gap 300 need not close in order to secure the conduit 110 (see FIG. 2) to the connector assembly 100. In other words, the first circumferential end 280 of the compression ring 130 need not make contact with the second circumferential end 290 of the compression ring 130 in order for the connector assembly 100 to be secured with the conduit 110 or for the sealing ring 140 to form a superior seal against contaminants and moisture.

The radial thicknesses of the various components may also be adjusted as desired. For example, a larger radial thickness at the connector second axial end 230 would permit a larger connector chamfer 270, which in turn may enhance the seal formed between the components of the connector assembly 100.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A connector assembly,
    a) the connector assembly including:
        1) a connector body;
        2) a compression ring including:
            (i) a first circumferential end;
            (ii) a second circumferential end that is complementarily interfittable with the first circumferential end;
            (iii) a circumferential gap between the first circumferential end and the second circumferential end; and
            iv a first axial compression ring end and an opposing second axial compression ring end;

3) a compression nut having the compression ring positioned therein;
b) wherein:
1) the connector body interfaces with the compression nut, with the compression ring compressed therebetween, and
2) the compression ring is beveled by having a portion of the second axial compression ring end angled radially inwardly within the compression nut.

2. The connector assembly of claim 1, wherein the compression ring being beveled enhances compression of the compression ring between the connector body and the compression nut.

3. The connector assembly of claim 1, wherein:
a) the connector body further includes:
1) a connector first axial end; and
2) a connector second axial end opposing the connector first axial end, the connector second axial end having a connector outer surface that is threaded;
b) the compression nut further includes:
1) a nut first axial end having a nut inner surface that is threaded; and
2) a nut second axial end opposing the nut first axial end, and
c) the connector second axial end screws into the nut first axial end.

4. The connector assembly of claim 3, wherein the first circumferential end of the compression ring is pressed closer to the second circumferential end by the screwing of the connector body into the compression nut.

5. The connector assembly of claim 4, further including a sealing ring, wherein the sealing ring is pressed between the compression ring and the connector second axial end by the screwing of the connector body into the compression nut.

6. The connector assembly of claim 5, wherein the connector second axial end further includes a connector chamfer so that the connector second axial end is more interfittable with the sealing ring.

7. The connector assembly of claim 6, wherein:
a) the sealing ring further includes:
1) a sealing ring first axial end having a first sealing ring diameter; and
2) a sealing ring second axial end opposing the sealing ring first axial end, the sealing ring second axial end having a second sealing ring diameter,
b) the first sealing ring diameter is less than the second sealing ring diameter.

8. The connector assembly of claim 7, wherein the connector chamfer presses against the sealing ring first axial end by the screwing of the connector body into the compression nut.

9. The connector assembly of claim 7, wherein:
a) the connector body and the compression nut are at least substantially cylindrical,
b) the connector assembly interfaces with a conduit that is at least substantially cylindrical,
c) the conduit is inserted through the compression nut, and
d) the conduit is secured to the connector assembly by the compression ring.

10. A connector assembly,
a) the connector assembly including:
1) a connector body that is at least substantially cylindrical,
(i) the connector body including:
(a) a connector first axial end having a connector first end inner surface and a connector first end outer surface opposing the connector first end inner surface; and
(b) a connector second axial end having a second connector inner surface and a connector second end outer surface opposing the second connector inner surface;
(ii) wherein at least one of the connector first end outer surface and the connector second end outer surface is threaded;
2) a compression ring including:
(i) a first circumferential end and a second circumferential end;
(ii) a circumferential gap between the first circumferential end and the second circumferential end; and
(iii) a first axial compression ring end opposing a second axial compression ring end;
3) a sealing ring having a sealing ring first axial end and an opposing sealing ring second axial end;
4) a compression nut that is at least substantially cylindrical, the compression nut including:
(i) a nut first axial end having a nut first axial end inner surface that is threaded; and
(ii) a nut second axial end opposing the nut first axial end, the nut second axial end having a nut second axial end inner surface;
b) wherein:
1) the compression ring and the sealing ring are positioned within the compression nut,
2) the connector second axial end screws into the nut first axial end, and
3) the compression ring presses the sealing ring against the connector second axial end such that the sealing ring second axial end is positioned radially closer to the nut second axial end inner surface than the first axial compression ring end.

11. The connector of claim 10, wherein the first circumferential end is complementarily interfittable with the second circumferential end.

12. The connector assembly of claim 10, wherein screwing the connector second axial end into the nut first axial end brings the first circumferential end closer to the second circumferential end.

13. The connector assembly of claim 12, wherein:
a) the sealing ring includes:
1) a sealing ring first diameter at the sealing ring first axial end;
2) a sealing ring second diameter at the sealing ring second axial end,
b) the sealing ring first diameter is smaller than the sealing ring second diameter, and
c) the connector second axial end presses against the sealing ring first axial end as the connector second axial end screws into the first nut first axial end.

14. The connector assembly of 13, further including a conduit inserted through the compression nut, wherein the compression ring secures the conduit to the compression nut.

15. The connector assembly of claim 14, wherein:
a) the connector first axial end of the connector body has a connector first end outer surface that is threaded,
b) the connector assembly further includes:
1) a gasket;
2) a locknut;
3) an insulating bushing, and
c) the gasket, the locknut, and the insulating bushing interface with the connector first axial end.

16. The connector assembly of claim 12, wherein the connector second axial end includes a connector chamfer so that the connector second axial end is interfittable with the sealing ring.

17. A connector assembly,
a) the connector assembly including:
1) a connector body having:
(i) a connector first axial end that is at least substantially cylindrical; and
(ii) a connector second axial end that is at least substantially cylindrical, the connector second axial end having a connector second end outer surface that is threaded;
2) a compression nut having a nut first axial end and a nut second axial end,
(i) the nut first axial end having a nut first axial end inner surface that is threaded; and
(ii) the nut second axial end having a nut second axial end inner surface; and
3) a compression ring positioned within the compression nut, the compression ring including:
(i) a first circumferential end;
(ii) a second circumferential end, wherein the first circumferential end is complementarily interfittable with the second circumferential end;
(iii) a circumferential gap between the first circumferential end and the second circumferential end, the circumferential gap allowing compression of the compression ring; and
(iv) a first axial compression ring end opposing a second axial compression ring end, wherein the second axial compression ring end includes a beveled portion having a second diameter that is greater than a first diameter of the first axial compression ring end such that the second axial compression ring end extends radially outwardly towards the nut first axial end inner surface;
b) wherein the connector second axial end screws into the nut first axial end, compressing the compression ring.

18. The connector assembly of claim 17 further including a sealing ring, wherein the screwing of the connector second axial end into the nut first axial end causes:
a) the compression nut to press against the compression ring,
b) the compression ring to press against the sealing ring,
c) the sealing ring to press against the connector second axial end, and
d) the first circumferential end of the compression ring to approach the second circumferential end of the compression ring.

19. The connector assembly of claim 17 further including a sealing ring, wherein:
a) the connector second axial end further includes a connector chamfer so that the connector second axial end is more interfittable with the sealing ring,
b) the sealing ring further includes:
1) a sealing ring first axial end having a first sealing ring diameter; and
2) a sealing ring second axial end having a second sealing ring diameter, wherein the second sealing ring diameter is greater than the first sealing ring diameter,
c) the compression ring presses the sealing ring first axial end against the connector chamfer.

20. The connector assembly of claim 17 further including a sealing ring, wherein:
a) the sealing ring includes a sealing ring first axial end and a sealing ring second axial end opposing the sealing ring first axial end, the sealing ring second axial end having a sealing ring chamfer so that the sealing ring is interfittable with the compression ring, and
b) the sealing ring second axial end is pressed against the first axial compression ring end.

* * * * *